March 3, 1936.　　　K. FERRIER　　　2,032,654
AUTOMOBILE WRECKING CRANE
Filed Jan. 23, 1935　　　2 Sheets-Sheet 1
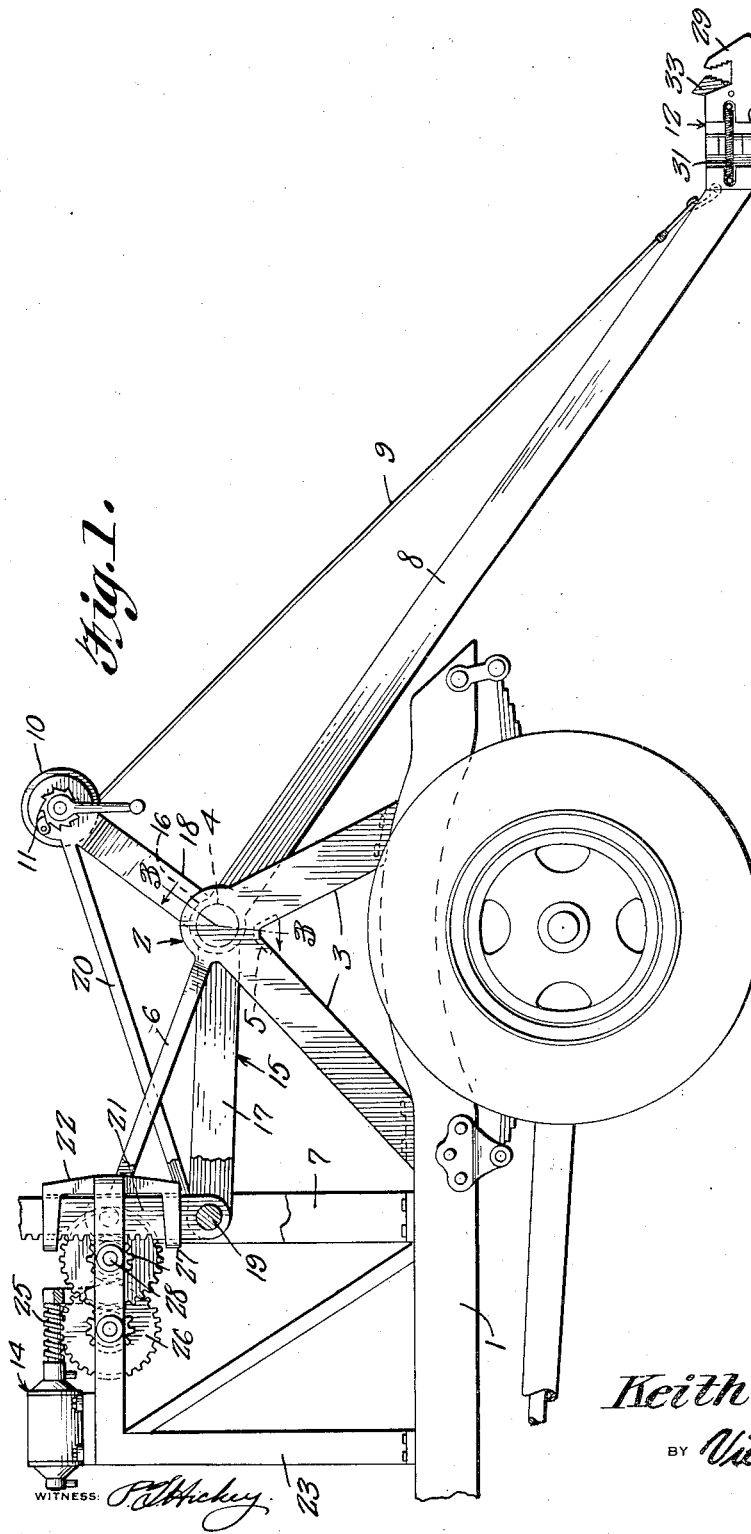
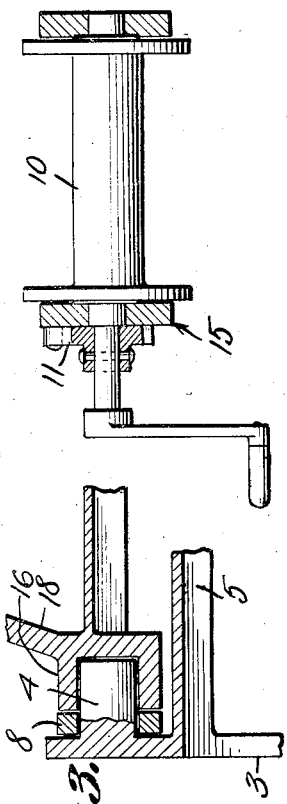
Keith Ferrier,
INVENTOR
BY Victor J. Evans & Co.
ATTORNEY March 3, 1936.  K. FERRIER  2,032,654
AUTOMOBILE WRECKING CRANE
Filed Jan. 28, 1935  2 Sheets-Sheet 2
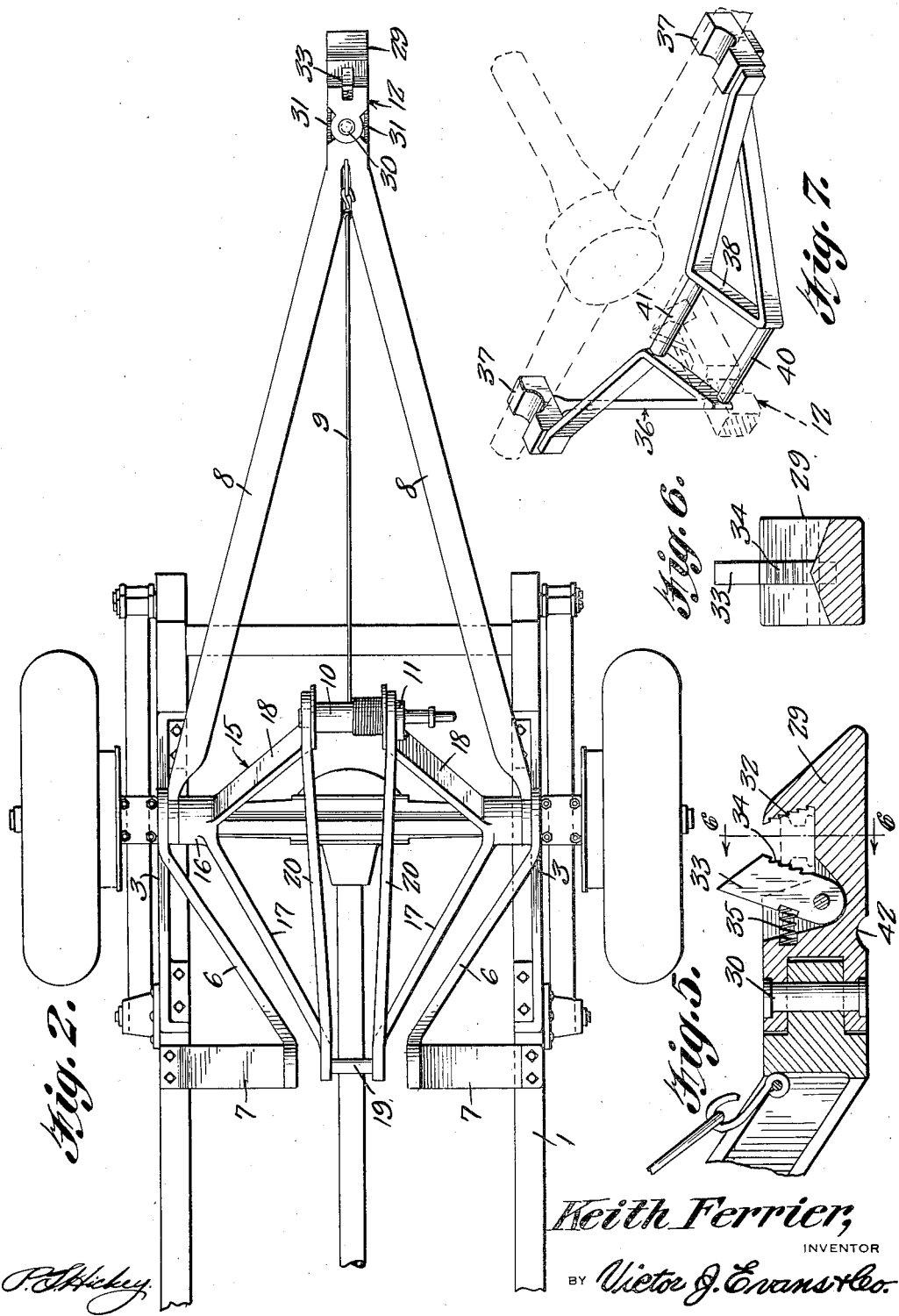

Patented Mar. 3, 1936

2,032,654

UNITED STATES PATENT OFFICE 2,032,654

AUTOMOBILE WRECKING CRANE

Keith Ferrier, Pocatello, Idaho

Application January 28, 1935, Serial No. 3,845

4 Claims. (Cl. 214—86)

This invention relates to cranes especially adapted for lifting and towing disabled or wrecked automobiles, and has for the primary object the provision of a device of the above stated character which may be readily mounted or fixed to the chassis of a motor truck or motor vehicle and may be easily applied or attached to either the front or rear end of a wrecked or disabled automobile to permit lifting of the latter by motor power whereby the wrecked automobile may be towed without danger of injuring or marring any of the undamaged parts thereof and further the device prevents side sway of the wrecked automobile during the towing thereof and also eliminates jars or jerks thereto while being lifted and lowered by said device.

With these and other objects in view this invention consists in certain novel features of construction, combination and arrangement of parts to be hereinafter more fully described and claimed.

For a complete understanding of my invention, reference is to be had to the following description and accompaying drawings, in which Figure 1 is a fragmentary side elevation illustrating a motor truck with a motor propelled crane installed thereto and constructed in accordance with my invention.

Figure 2 is a fragmentary top plan view illustrating the same.

Figure 3 is a detail sectional view taken on the line 3—3 of Figure 1.

Figure 4 is a detail sectional view illustrating a windlass employed for adjusting the foot of the crane to a disabled automobile.

Figure 5 is an enlarged detail sectional view showing the foot of the crane.

Figure 6 is a sectional view taken on the line 6—6 of Figure 5.

Figure 7 is a fragmentary perspective view illustrating an attachment for the foot to adapt the latter to the rear axle housing of an automobile.

Referring in detail to the drawings, the numeral 1 indicates a fragmentary portion of a motor truck chassis and has mounted thereto a crane 2 forming the subject matter of the present invention. Secured to the chassis 1 are substantially inverted V-shaped supports 3 provided with pintles 4 disposed above and in alignment with the rear axle of the motor truck. The supporting members 3 are connected and reinforced by a brace 5 which also parallels the rear axle of the motor truck. The pintles 4 have connected thereto braces 6 which extend forwardly and upwardly from said pintles and are integrally formed with supporting elements 7 which include vertical and horizontal portions. The vertical portions are relatively spaced and have the braces integrally connected therewith while the horizontal portions are bolted or otherwise secured to the chassis or motor truck forwardly of the rear axle. Journaled to the pintles 4 is a crane arm 8 of substantially V-shape having its apex free to move upwardly and downwardly with respect to the motor truck chassis. An adjusting cable 9 is detachably connected to the apex of the crane arm and is secured to and wound on a windlass 10 adapted for manual operation and which may be locked against rotation by pawl and ratchet mechanisms 11. Carried by the apex of the crane arm is a foot 12, the detail construction of which will be hereinafter more fully described. Through the operation of the cable 9 and windlass 10 the foot may be lowered into engagement with the ground, as shown in Figure 1, and when positioned under the front end of a disabled automobile, the foot may be brought up to engage and grip the front axle of said disabled automobile and by the operation of a motive power 14 the crane arm will be caused to swing upwardly and thereby lift the front end of the disabled automobile from the ground. The disabled automobile when thus supported may be towed by the motor truck.

The windlass 10 is mounted to a subframe 15 consisting of journals 16 mounted in the pintles 4. Pairs of arms 17 and 18 are integral with the journals 16 and the pair of arms 17 converge and extend forwardly of the rear axle of the motor truck and are connected by a pin 19. The ends of the arms 17 connected by the pin 19 terminate between the vertical portions of the supporting members 7. The arms 18 converge and extend upwardly and rearwardly of the rear axle of the motor truck and form journals for the windlass 10. The arms 18 are connected to the arms 17 by braces 20. The pin 19 has journaled thereto a rack bar 21 slidably supported by a bracket 22 and the latter is in turn pivoted to a skeleton frame 23 mounted on the chassis of the motor truck forwardly of the supporting arms 17. The skeleton frame carries a motive power 14 which may be of different types while in this instance it is shown as consisting of an electric motor 24 of the reversible type, the power take-off shaft thereof being in the form of a worm 25 meshing with a worm gear 26 forming a part of a train of gears rotatably mounted on the skeleton frame 23. A pinion 27 forming a part of the train of gears is journaled to a shaft 28 carried by the skeleton frame and meshes with the rack bar. The shaft 28 forms a journal for the bracket 22 which slidably supports the rack bar and due to its pivotal mounting on the shaft 28 will permit a swinging movement of the rack bar besides the sliding movement permitted by the bracket 22. The electric motor 24 set in operation and the windlass locked with the foot in engagement with the axle of the disabled automobile, the crane 8 will be caused to swing upwardly and thereby elevate the disabled automobile without imparting to the latter jerks or jars. Due to the worm 25 and the worm gear 26 the crane arm when under load will maintain any of its positions when the motor 14 is stopped.

The foot 12 consists of a body 29 connected to the apex of the crane arm by a vertically arranged pivot 30 which permits the body of the foot to swing in either direction in a horizontal plane and the body is further connected to the apex of the crane arm by coil springs 31 and the latter act to position the body in alignment with the apex so that the body of the foot will be properly positioned to engage with the axle of a disabled automobile when brought in engagement therewith through the operation of the windlass. The body 29 of the foot is recessed to receive the axle, as shown in Figure 5, one wall of which is serrated, as shown at 32, to form a fixed jaw. A movable jaw 33 having a serrated face 34 is pivoted in the recess of the body and is urged in the direction of the fixed jaw by a spring 35. The pivoted jaw has its free end beveled so that when the foot is elevated in engagement with the axle of a disabled automobile the axle may move into the recess with the serrated faces engaging opposite sides of the axle thereby firmly retaining the axle in a seated position in the recess of the jaw. To adapt the foot for elevating the rear end of a disabled automobile, an attachment 36 is employed consisting of bearings 37 connected by frame elements 38 so that the bearings 39 may engage with the rear axle housing adjacent the ends thereof. The frame elements 38 include spaced bars 40 and 41. The bar 41 is disposed in a plane above the bar 40 and the body 29 is received between said bars with the bar 41 entering the recess thereof to be engaged by the jaws while the bar 40 seats in a recess 42 formed in the bottom wall of the body 29. The attachment 38 when applied to the foot 12 permits the crane to elevate a disabled automobile at the rear end thereof by contacting with the rear axle housing adjacent the ends thereof and obviates the possibility of the foot engaging or contacting with the differential housing.

Having described the invention, I claim:

1. A crane comprising a supporting structure mounted to the chassis of a motor truck, pintles carried by the supporting structure, a crane arm journaled to said pintles and extending rearwardly of the motor truck, means carried by the crane arm to connect the latter to a part of a disabled automobile, a subframe journaled to the pintles and including a lever construction, a windlass carried by the subframe and connected to the free end of the crane arm, a slidably supported rack bar connected to the lever construction, and a power means mounted to the truck and geared to the rack bar for effecting raising and lowering of the crane arm.

2. A crane comprising a supporting structure secured to a chassis of a motor truck and including pintles, a crane arm journaled to said pintles, a subframe journaled to said pintles, a windlass carried by the subframe and connected to the free end of the crane arm, power means connected to the subframe for raising and lowering the frame, a foot pivoted to the free end of the crane arm and having a recess with one wall serrated to form a fixed jaw, a movable jaw pivoted in the recess and having a beveled end, a spring for urging the movable jaw towards the fixed jaw for causing said jaws to grip an axle of a disabled automobile when positioned in the recess.

3. A crane comprising a supporting structure secured to a chassis of a motor truck and including pintles, a crane arm journaled to said pintles, a subframe journaled to said pintles, a windlass carried by the subframe and connected to the free end of the crane arm, power means connected to the subframe for raising and lowering the frame, a foot pivoted to the free end of the crane arm and having a recess with one wall serrated to form a fixed jaw, a movable jaw pivoted in the recess and having a beveled end, a spring for urging the movable jaw towards the fixed jaw for causing said jaws to grip an axle of a disabled automobile when positioned in the recess, springs connected to the crane arm and to opposite sides of the foot.

4. A crane comprising a supporting structure secured to a chassis of a motor truck and including pintles, a crane arm journaled to said pintles, a subframe journaled to said pintles, a windlass carried by the subframe and connected to the free end of the crane arm, power means connected to the subframe for raising and lowering the frame, a foot pivoted to the free end of the crane arm and having a recess with one wall serrated to form a fixed jaw, a movable jaw pivoted in the recess and having a beveled end, a spring for urging the movable jaw towards the fixed jaw for causing said jaws to grip an axle of a disabled automobile when positioned in the recess, springs connected to the crane arm and to opposite sides of the foot, an attachment engaging the jaws and the under side of the foot and having bearing portions to engage with the rear axle housing of a disabled automobile adjacent the ends of the latter.

KEITH FERRIER.